US007775723B2

(12) United States Patent
Maffre

(10) Patent No.: US 7,775,723 B2
(45) Date of Patent: Aug. 17, 2010

(54) ASSEMBLY INCLUDING A ROTARY SHAFT AND A ROLLER BEARING

(75) Inventor: Jean-Philippe Julien Maffre, Le Clos Saint Jacques (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 11/181,885

(22) Filed: Jul. 15, 2005

(65) Prior Publication Data

US 2006/0291955 A1 Dec. 28, 2006

(30) Foreign Application Priority Data

Jul. 15, 2004 (FR) .................................. 04 07854

(51) Int. Cl.
*F16C 43/00* (2006.01)

(52) U.S. Cl. ....................... 384/537; 384/539; 384/559; 384/561

(58) Field of Classification Search ................. 403/313, 403/359.1, 359.5, DIG. 7; 464/182, 901; 416/198 A, 247 R, 174; 384/537, 539, 559–561, 384/564, 584, 585; 415/174.5, 229, 230
See application file for complete search history.

(56) References Cited

U.S. PATENT DOCUMENTS 2,439,161 A * 4/1948 Du Bois ..................... 248/672
2,553,220 A * 5/1951 Troeger ................... 403/374.1
2,785,550 A * 3/1957 Petrie ...................... 403/359.6
2,890,900 A * 6/1959 Williamson, Jr. et al.
2,913,261 A * 11/1959 Matchett ..................... 403/152
3,191,453 A * 6/1965 Hoven ........................ 403/364
3,393,533 A 7/1968 Wilkinson
3,571,886 A * 3/1971 Corsmeier .................. 464/182
3,616,958 A * 11/1971 Mitchell
3,631,735 A * 1/1972 McCarty .................. 403/359.5
3,637,238 A * 1/1972 Grosch
3,722,058 A * 3/1973 Corsmeier .................. 464/182
3,750,489 A * 8/1973 Caldwell ............... 403/DIG. 7
3,900,270 A * 8/1975 Rhodes .................... 403/359.1
4,290,515 A * 9/1981 Bogema et al. ............... 74/331
4,653,984 A * 3/1987 Robbins ................. 416/198 A
4,687,084 A * 8/1987 Leigh-Monstevens et al. .......................... 403/364
4,884,903 A 12/1989 Pham et al.
5,236,302 A * 8/1993 Weisgerber et al. ...... 415/174.5
5,320,488 A * 6/1994 Meade et al. ............ 415/174.5
5,685,650 A * 11/1997 Martinie et al. ............. 384/585
5,863,137 A 1/1999 Johnson et al.
6,413,008 B1 * 7/2002 van Dest et al. ............. 403/364
6,494,684 B1 * 12/2002 Wagner ...................... 416/248

FOREIGN PATENT DOCUMENTS

EP 0 359 659 3/1990
FR 2 629 537 10/1989

* cited by examiner

*Primary Examiner*—Victor MacArthur
(74) *Attorney, Agent, or Firm*—Oblon, Spivak, McClelland, Maier & Neustadt, L.L.P.

(57) ABSTRACT

An assembly composed of a rotary shaft and of a roller bearing supporting said shaft, the bearing including a ring interconnected with the shaft and forming a raceway. The assembly provides that the ring is immobilized in rotation on the shaft by a coupling formed by a plurality of teeth on the shaft cooperating with lugs interconnected with the ring, the lugs being received between said teeth. The ring is retained in an axial direction by a snap ring transversal in the form of a ring portion.

13 Claims, 3 Drawing Sheets

PREVIOUS ART

ASSEMBLY INCLUDING A ROTARY SHAFT AND A ROLLER BEARING

BACKGROUND OF THE INVENTION

1. Field of Invention

The present invention relates to an assembly including a shaft or a portion of shaft mounted rotatably around its axis and of a roller bearing by which it is supported. The present invention applies in particular to the installation of a bearing for a turbine shaft in a gas turbine engine.

2. Description of the Related Art

FIG. 1 represents a partial view of a gas turbine engine 1. The high pressure turbine rotor 2 is situated immediately downstream of the combustion chamber 3 and is driven into rotation by the action of the gases flowing therefrom on the vanes 4 mounted on the disk 5 of the rotor 2. The turbine disk 5 is interconnected with a journal 6, arranged downstream relative to the flow direction of the gases. At the end of the journal 6 a bearing is mounted which supports the rotary assembly. Only the internal ring 8 of the bearing is here represented. The rotor 2 is interconnected upstream with a drum 7 linked with the high pressure compressor, not represented, itself supported rotatably by an upstream bearing. This rotary assembly forming the high pressure spool of the engine is supported by dint of both these bearings either by the fixed structure of the engine in the case of a single spool engine or by another rotary assembly in the case of a double or triple spool engine for independent low pressure or intermediate pressure stages.

In current engines, the internal ring is interconnected with the shaft or journal by sintering. By this operation the ring is clamped on the shaft or journal. The coupling may then resist the rotational torques to which the ring is subjected during the operation of the engine as well as to the axial loads. A downstream nut 9, screwed on the journal and blocked in rotation, locks the ring 8 in position and ensures cohesion of the assembly should the ring become loose on the journal because of, for example, worn contact surfaces or excessive heating of the components. To cover all the faulty cases and avoid any incident the nut may be oversized to be able to impart high tightening torque to the assembly.

This solution exhibits therefore the shortcoming of high mechanical load of the parts. The size of the nut depends in particular on the load requested. It is hence necessary to design and to implement heavy and complex tools with force division means.

Besides, it would be desirable, for certain applications, in particular in the case of new more compact engines, to reduce the axial space requirements of the shaft supporting the turbine, with its bearing. The position of the bearing being itself perfectly defined in its environment relative to the other components of the engine such as the fixed structure, only the section including the nut could be modified. However, taking into account the loads reminded of above, it is not possible to reduce the size of the nut without reducing the mechanical strength of the assembly.

To solve this problem, it has been suggested in a first step to do away with the nut and to weld the ring directly to the shaft. This solution, however, may not be acceptable, at least for certain engines, because of the different materials forming both these components, corrosion problems which might derive therefrom, and of the complex operations when, at a later stage, it would be necessary to intervene on the part itself.

SUMMARY OF THE INVENTION

The applicant has therefore set as a first target to provide an assembly mode of a roller bearing ring, to the shaft whereon it is mounted, enabling to solve these shortcomings while offering the same mechanical features as those provided by a nut.

The applicant has also set as another target the realisation of an assembly mode of a roller bearing ring on a shaft, which can be mounted and dismantled easily.

The invention solves this problem with an assembly composed of a rotary shaft and of a roller bearing, the bearing including a ring interconnected with the shaft and forming a raceway for the running gear of the bearing, characterised in that the ring is immobilized in rotation on the shaft by a coupling formed by a plurality of teeth on the shaft cooperating with lugs interconnected with the ring, the lugs being received between said teeth, and in axial direction by a transversal snap ring in the form of a ring portion.

The term shaft designates a shaft, a portion of shaft, a journal or more generally any part whereon a roller bearing is mounted. Whereas, in the case of a bearing assembly at the end of a journal on its free end side, the nut, because of the assembly loads, must abut against the ring on its edge close to the free end of the journal, a claw coupling may be provided on the opposite side relative to the free end. The corresponding portion of journal may then be shortened. Besides, advantageously, the axial retaining means may be associated with the claw coupling.

Advantageously, the coupling is made of a plurality of teeth, respectively lugs, spaced apart from one another along the circumference of the shaft. The number of teeth and of associated lugs, as well as the dimension thereof, is determined by the circumferential loads that the coupling is supposed to sustain during the operation of the engine. To avoid unbalances, the elements are advantageously arranged symmetrically around the axis of the shaft.

It should be understood that the solution applies to the installation of an internal bearing ring on the outer surface thereof, as well as to the installation of an external bearing ring on a shaft inside thereof when it is hollow.

The roller bearing may be any bearing, ball bearing, roll bearing or other. In a simplified manner, a bearing comprises at least two concentric rings: an internal ring and an external ring, between which a plurality of running gears is arranged, rolls for example, held spaced from one another by a stand. The rings define each a raceway for the running gear.

According to another feature, the axial retaining means is formed of a snap ring added transversally relative to the axis of the shaft. In particular, the snap ring is in the form of a ring portion and is made of a plastic material. It takes on a first radially extended shape and where it makes said axial retainer between the shaft and the ring, and a radially retracted shape where it enables the axial displacement of the ring relative to the shaft. According to the preferred embodiment, in retention position, the snap ring is arranged so as to be in contact both with one tooth and at least one lug.

According to another feature, the shaft comprises a cylindrical portion forming an external radial stop of the free end of the lug(s).

BRIEF DESCRIPTION OF THE DRAWINGS

Other features and advantages will appear in the following description of an invention embodiment, in conjunction with the appended drawings whereon.

DETAILED DESCRIPTION OF THE PREFERRED EMBODIMENTS

Figure 1:
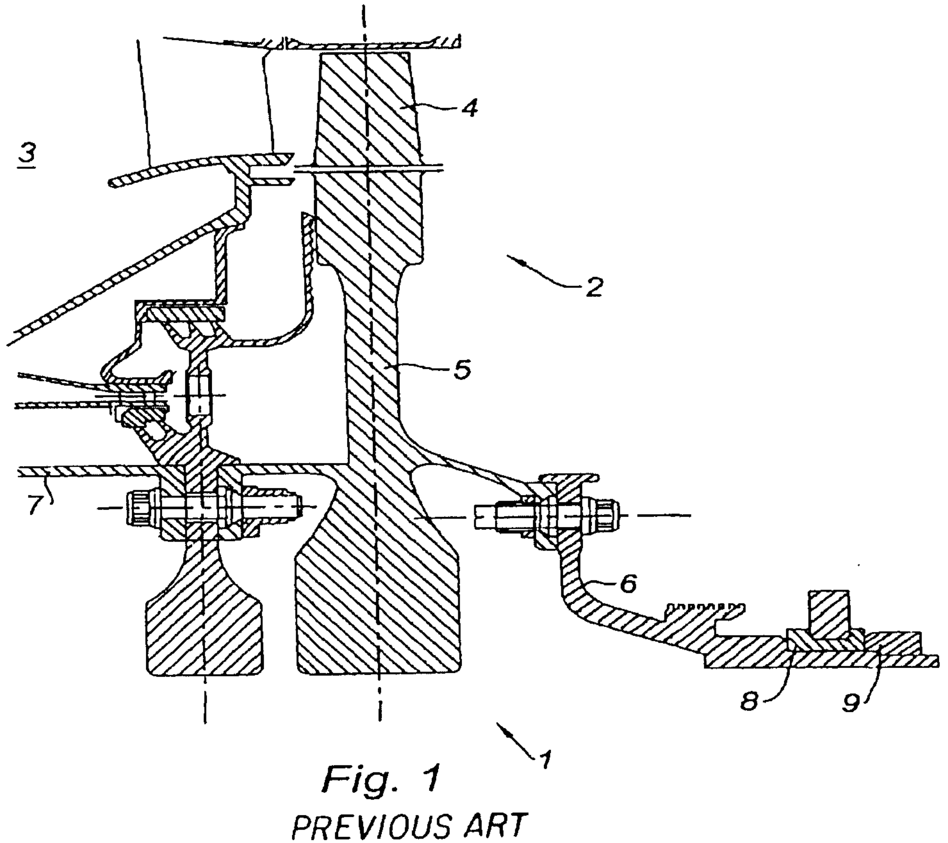
FIG. 1 is a sectional axial view of a portion of a gas turbine engine showing a turbine rotor and the journal with a bearing ring installed according to the previous art.
Figure 2:
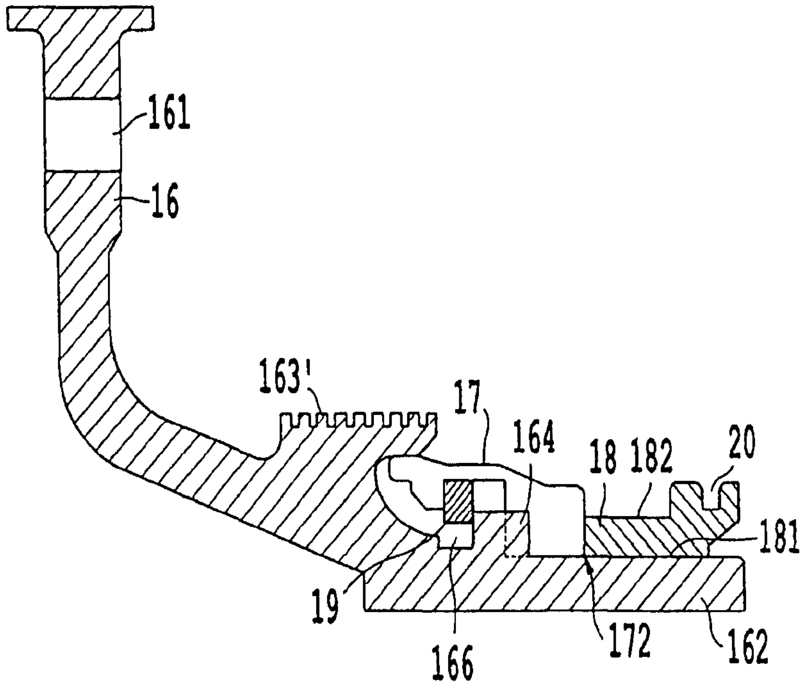
FIG. 2 is an axial sectional view of a journal with an internal ring of roller bearing installed according to the invention.
Figure 3:
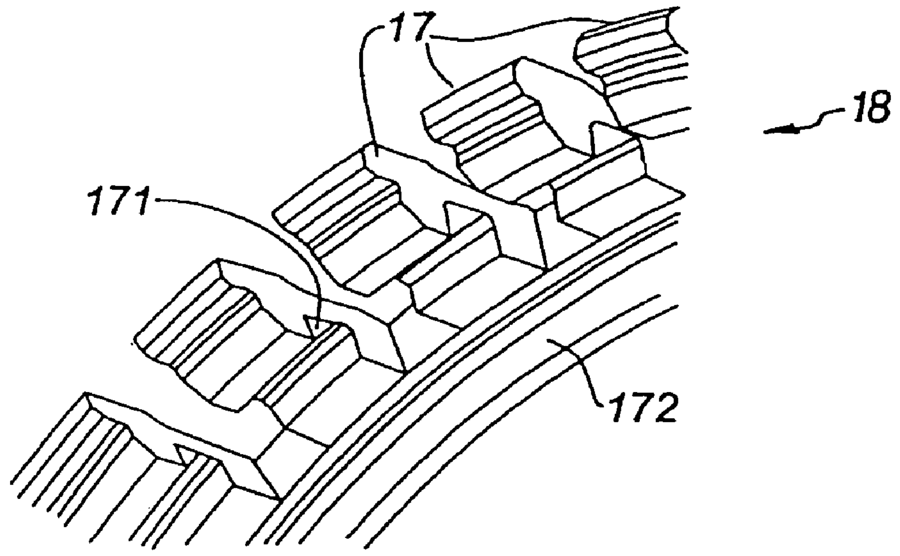
FIG. 3 is a partial perspective view of the internal ring of FIG. 2 detailing the lugs.

FIG. 2 shows a journal 16 or a turbine shaft associated with the turbine rotor not represented, according to the invention. FIG. 6 shows partially a representation of the disposition of FIG. 2 seen in perspective. The journal comprises a flange with bores 161 through which the turbine rotor is bolted in 161. In FIG. 2, one can distinguish a cylindrical portion 163', with the same rotational axis as the shaft, fitted with elements such as tabs forming with additional elements not represented a labyrinth sealing joint. As seen in FIG. 2, the cylindrical portion 163' forms an external radial stop disposed radially outward of and overlapping, in a radial direction, a portion of lugs 17. As further seen in FIG. 2 the portion of the lugs is disposed, in the axial direction, farther from the external raceway 182 than is disposed the snap ring 19. The cylindrical portion 163' forming an external radial stop directly contacts the lugs 17 in the radial direction. In FIGS. 4, 5, 6 and 7, the cylindrical portion 163 is shown without the tabs shown on cylindrical portion 163'. The journal also comprises a right-hand cylindrical portion 162 for the installation of an internal ring 18 of a roller bearing. The ring 18 comprises an internal cylindrical portion 181 sintered on the cylindrical portion 162 of the journal. The ring comprises an external raceway 182 for the running gear, here rolls, not represented as well as the remainder of the bearing. On the left-hand side on the figure, the ring is extended, along the common axis of the ring and of the shaft, by lugs 17. These lugs 17 are perfectly visible on FIG. 3 which is a partial perspective view of the ring 18. Each lug exhibits an internal groove 171, directed to the axis of the ring and transversally thereto. The lugs are here distributed over the whole ring 17 with a determined spacing corresponding to the width of the teeth described below.

Figure 4:
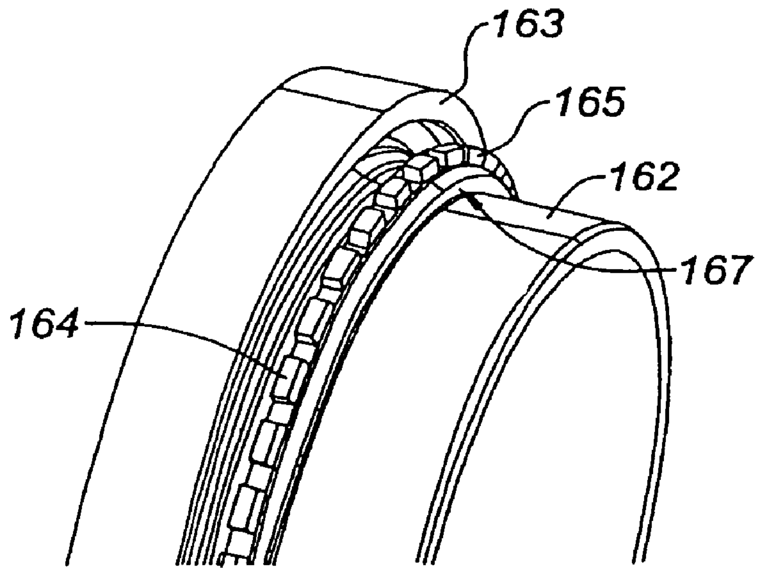
FIG. 4 shows, in perspective, the journal of FIG. 2 with the teeth of the claw coupling.

The ring 18 abuts by the surface 172, oriented transversally relative to the axis, against an axial stop 167 provided on the cylindrical portion 162. The surface 172 appears clearly on FIG. 4 showing the end of the journal according to a perspective view, individually. Radial teeth 164 are arranged at the periphery thereof, while being spaced from one another with a spacing corresponding to the width of the lugs 17. Thus, in the position of FIG. 2, the lugs 17 are placed between the teeth 164, the ring resting by the face 172 against the axial stop 167. The ring 18 and the journal 16 form thus a claw coupling. By this coupling, the ring is solidly immobilized in rotation, even if the clamping of the ring on the shaft grows weak.

The teeth are aligned transversally to the axis of the shaft and provide a transversal groove 166, open radially, on the side opposite to that of the faces 165. When the ring rests against the axial stop 167, the groove 166 faces grooves 171 provided on the lugs 17. In the assembly of FIG. 2, a snap ring 19, transversal to the axis, is received in the extension of the grooves 171, and forms said axial retaining means in a first state. Indeed, being received in the assembly of the grooves 171, its height is sufficient to engage with all the teeth 164. As can be seen on FIG. 2, it prevents any retraction movement of the ring towards the right-hand side on the figure. It can be seen on FIG. 7 which shows an enlarged detail of FIG. 6, the snap ring 19 in a locking position. This snap ring has here a rectangular section. It extends over the whole circumference. It forms a ring with a missing portion. It is elastic, preferably of metal, and may then be retracted to a second state by appropriate means to be received in the groove 166 of the journal. When it is in the latter position, which is a second state, it does not oppose the axial movement of the ring. The depth of the groove 166 is sufficient to receive the snap ring and to retract it completely relative to the lugs of the ring.

Figure 6:
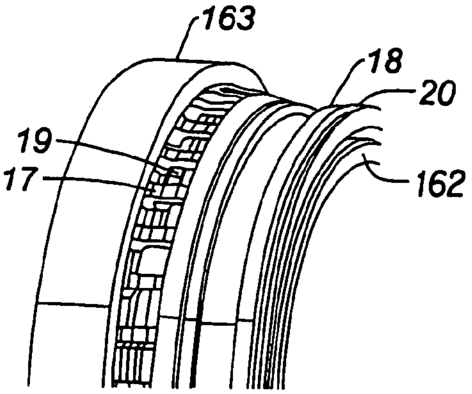
FIG. 6 shows, in perspective, the ring installed on the journal of FIG. 2.
Figure 7:
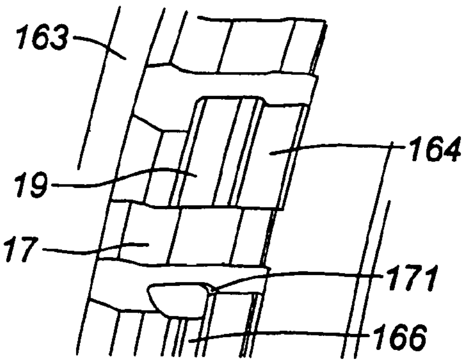
FIG. 7 shows an enlarged detail of FIG. 6.

As it appears on FIGS. 2, 6 and 7, the free section of the lugs 17 is engaged in an axial groove turned downward, formed between the cylindrical portion (163')/163 and the surface of the cylindrical portion of journal. The lugs 17 rest radially externally against the internal surface of this cylindrical portion (163')/163. Inasmuch as the assembly may rotate at very high rotational speeds, the radial rest provided by the element (163')/163 enables to reduce the deformations and the loads caused by centrifugal forces exerted on the lugs. The durability of the parts is then increased considerably.

Figure 5:
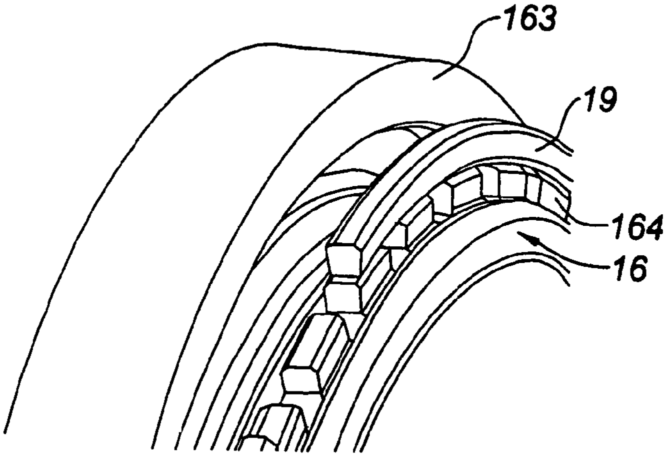
FIG. 5 shows the positioning of an annular snap ring on the journal of FIG. 4.

When installing the ring 18 on the journal 16, the snap ring is placed first of all by sliding behind the teeth 164, as represented on FIG. 5; it is sufficiently elastic to be deformed. Then, by means of an appropriate tool, the snap ring is forcibly retracted in the groove 166. While holding the snap ring in this position, the ring is slid along the cylindrical portion 162, until faces 172 of the ring abut against the axial stop 167. The engagement of the lugs between the teeth forming a claw coupling then release the snap ring which is slackened and received in the grooves 171, thereby locking the ring 18 axially.

For disassembly purposes, an annular notch 20 is provided through which the ring may be extracted by means of an appropriate tool. It may also be observed that a tool may be inserted easily between the teeth 164 to retract the snap ring 19.

The installation of an internal roller ring of a roller bearing has been described. The invention also applies, mutatis mutandis, to the installation of the external ring of a roller bearing on the internal surface of a shaft or of a casing structure. Besides, the claw coupling may be realised by reversing the teeth and the lugs, the former on the ring and the latter interconnected with the shaft. Other variations understandable to the man of the art are included within the framework of the present invention. In particular the invention is not limited to the installation of a ring on a turbine shaft, with a wider scope.

The invention claimed is:

1. An assembly comprising:

a rotary shaft; and an internal ring of a roller bearing supporting said shaft, the ring being interconnected with the shaft and forming a raceway, wherein the ring is immobilized in rotation on the shaft by a coupling formed by a plurality of teeth on the shaft cooperating with lugs interconnected with the ring, the lugs being received between said teeth, and the ring being retained in an axial direction by a transversal snap ring forming a ring portion, wherein the shaft comprises a cylindrical portion forming an external radial stop disposed radially outward of and overlapping, in a radial direction, a portion of the lugs, the portion of the lugs being disposed, in the axial direction, farther from the raceway than is disposed the snap ring, wherein the ring includes an annular notch facing radially outward and configured to cooperate with an extraction tool, wherein the raceway is disposed, in the axial direction, between the annular notch and the snap ring.

2. The assembly according to claim 1, wherein the snap ring is made of an elastic material and, in a first state, has a first radially extended shape that forms an axial retention and, in a second state, has a radially retracted shape that enables axial displacement of the ring relative to the shaft.

3. The assembly according to claim 1, wherein the ring is installed on the outer surface of the shaft.

4. The assembly according to claim 1, wherein the shaft is a gas turbine engine shaft.

5. The assembly according to claim 1, wherein the shaft includes tabs on an external surface configured to form a labyrinth seal.

6. The assembly according to claim 1, wherein the snap ring, with respect to a radial direction, is disposed directly between the ring and the rotary shaft.

7. The assembly according to claim 1, wherein the rotary shaft includes a first groove, which opens in a first radial direction.

8. The assembly according to claim 7, wherein the ring includes a second groove, which opens in a second radial direction opposite the first radial direction.

9. The assembly according to claim 8, wherein the first and second grooves oppose each other and the snap ring is disposed inside both of the first and second grooves.

10. A gas turbine including the assembly recited in claim 1.

11. The assembly according to claim 1, wherein the portion of the lugs extends, in the axial direction, partially into the shaft.

12. The assembly according to claim 1, wherein the portion includes a free end of the lugs.

13. An assembly comprising:

a rotary shaft; and an internal ring of a roller bearing supporting said shaft, the ring being interconnected with the shaft and forming a raceway, wherein the ring is immobilized in rotation on the shaft by a coupling formed by a plurality of teeth on the shaft cooperating with lugs interconnected with the ring, the lugs being received between said teeth, and the ring being retained in an axial direction by a transversal snap ring forming a ring portion, wherein the shaft comprises a cylindrical portion forming an external radial stop disposed radially outward of and overlapping, in a radial direction, a portion of the lugs, the portion of the lugs being disposed, in the axial direction, farther from the raceway than is disposed the snap ring, and wherein the cylindrical portion forming an external radial stop directly contacts the lugs in the radial direction.

* * * * *